United States Patent
Cooper (10) Patent No.: US 7,912,774 B2
(45) Date of Patent: *Mar. 22, 2011

(54) TRANSACTION CARD SYSTEM AND APPROACH

(75) Inventor: William A. Cooper, Wayzata, MN (US)

(73) Assignee: TCF Financial Corporation, Minneapolis, MN (US)

( * ) Notice: Subject to any disclaimer, the term of this patent is extended or adjusted under 35 U.S.C. 154(b) by 8 days.

This patent is subject to a terminal disclaimer.

(21) Appl. No.: 12/537,177

(22) Filed: Aug. 6, 2009

(65) Prior Publication Data

US 2009/0313108 A1 Dec. 17, 2009

Related U.S. Application Data

(63) Continuation of application No. 12/140,346, filed on Jun. 17, 2008, now Pat. No. 7,594,606, which is a continuation of application No. 11/019,651, filed on Dec. 21, 2004, now Pat. No. 7,398,919, which is a continuation-in-part of application No. 09/614,270, filed on Jul. 12, 2000, now abandoned.

(51) Int. Cl.
G06Q 40/00 (2006.01)
G07D 11/00 (2006.01)
G06K 5/00 (2006.01)

(52) U.S. Cl. ............ 705/35; 705/39; 235/375; 235/379; 235/380; 235/381

(58) Field of Classification Search ............ 705/35, 705/39; 235/375, 379, 380, 381
See application file for complete search history.

(56) References Cited

U.S. PATENT DOCUMENTS

| 4,346,442 A | 8/1982 | Musmanno |
| 4,376,978 A | 3/1983 | Musmanno |
| 4,597,046 A | 6/1986 | Musmanno et al. |

(Continued)

FOREIGN PATENT DOCUMENTS

WO    WO 9629668    9/1996

OTHER PUBLICATIONS

Veltri S, Cavanagh G. Payments. Business Lawyer [serial online]. Aug. 2009;64(4):1199-1218. Available from: Business Source Complete, Ipswich, MA. Accessed Dec. 14, 2010.*

*Primary Examiner* — Ella Colbert
*Assistant Examiner* — Daniel L Greene, Jr.
(74) *Attorney, Agent, or Firm* — Crawford Maunu PLLC (57) ABSTRACT

A deferred-type payment approach facilitates transaction card management and processing. According to an example embodiment, a user's transaction card purchases are authorized against a purchase limit associated with a consideration-bearing (e.g., interest-bearing) account. The purchases are tracked and, at the end of a billing cycle, provided to the user via a statement or other informative approach. During a payment time period after the end of the billing cycle, the user is afforded an opportunity to review tracked purchases and provide funds to cover the purchases. If the user does not provide funds for the purchases during the payment time period, funds are automatically transferred from the consideration-bearing account to cover the purchases at the end of the payment time period. In this regard, purchases made with the transaction card against the consideration-bearing account are not assessed against the consideration-bearing account until after the billing cycle has ended.

23 Claims, 6 Drawing Sheets

STATEMENT PROCESS

U.S. PATENT DOCUMENTS

| | | | |
|---|---|---|---|
| 4,774,663 A | 9/1988 | Musmanno et al. | |
| 5,025,138 A | 6/1991 | Cuervo | |
| 5,243,174 A | 9/1993 | Veeneman et al. | |
| 5,500,514 A | 3/1996 | Veeneman et al. | |
| 5,652,421 A | 7/1997 | Veeneman et al. | |
| 5,696,824 A | 12/1997 | Walsh | |
| 5,765,144 A | 6/1998 | Larche et al. | |
| 5,826,243 A | 10/1998 | Musmanno et al. | |
| 5,933,817 A | 8/1999 | Hucal | |
| 5,940,809 A | 8/1999 | Musmanno et al. | |
| 5,945,653 A | 8/1999 | Walker et al. | |
| 5,949,044 A | 9/1999 | Walker et al. | |
| 5,950,179 A | 9/1999 | Buchanan et al. | |
| 5,978,779 A | 11/1999 | Stein et al. | |
| 6,032,136 A | 2/2000 | Brake, Jr. et al. | |
| 6,038,552 A * | 3/2000 | Fleischl et al. | 705/44 |
| 6,078,907 A | 6/2000 | Lamm | |
| 6,108,641 A | 8/2000 | Kenna et al. | |
| 6,169,483 B1 | 1/2001 | Ghaffari et al. | |
| 6,182,894 B1 | 2/2001 | Hackett et al. | |
| 6,222,914 B1 | 4/2001 | McMullin | |
| 6,226,624 B1 | 5/2001 | Watson et al. | |
| 6,267,292 B1 | 7/2001 | Walker et al. | |
| 6,324,523 B1 | 11/2001 | Killeen, Jr. et al. | |
| 6,330,544 B1 | 12/2001 | Walker et al. | |
| 6,336,104 B1 | 1/2002 | Walker et al. | |
| 6,343,279 B1 * | 1/2002 | Bissonette et al. | 705/41 |
| 6,353,811 B1 | 3/2002 | Weissman | |
| 6,386,444 B1 | 5/2002 | Sullivan | |
| 6,394,341 B1 | 5/2002 | Mäkipää et al. | |
| 6,446,049 B1 | 9/2002 | Janning et al. | |
| 6,473,500 B1 | 10/2002 | Risafi et al. | |
| 6,609,654 B1 | 8/2003 | Anderson et al. | |
| 6,639,977 B1 | 10/2003 | Swope et al. | |
| 6,685,088 B1 | 2/2004 | Royer et al. | |
| 7,313,543 B1 * | 12/2007 | Crane et al. | 705/39 |
| 7,398,919 B2 | 7/2008 | Cooper | |
| 7,594,606 B2 | 9/2009 | Cooper | |
| 7,831,521 B1 * | 11/2010 | Ball et al. | 705/64 |
| 2003/0061157 A1 * | 3/2003 | Hirka et al. | 705/39 |
| 2005/0044039 A1 | 2/2005 | Greer et al. | |

* cited by examiner

TRANSACTION CARD SYSTEM AND APPROACH

RELATED PATENT DOCUMENTS

This patent document is a continuation of U.S. patent application Ser. No. 12/140,346 filed on Jun. 17, 2008, entitled "Transaction Card System and Approach," and issued as U.S. Pat. No. 7,594,606, which is a continuation of U.S. patent application Ser. No. 11/019,651 filed on Dec. 21, 2004, now U.S. Pat. No. 7,398,919; which is a continuation-in-part of U.S. patent application Ser. No. 09/614,270 (abandoned) filed on Jul. 12, 2000 and entitled "Debit Card Billing System;" priority is claimed to all of these patent documents under 35 U.S.C. §120, which are fully incorporated herein by reference.

FIELD OF THE INVENTION

The present invention relates to a transaction card system and approach with deferred billing.

BACKGROUND

Modern consumers have become accustomed to the safety and convenience of making purchase transactions at remote points of sale using credit cards instead of cash. Credit cards typically allow a consumer to make purchases on credit accounts in which a credit card issuing institution records purchases to a consumer's account and then sends a monthly billing statement to the consumer. If the consumer elects not to pay off the entire balance of the account at the end of the billing cycle, the credit card issuing institution typically collects interest on the outstanding balance on the account.

In response to the success of credit cards, banking institutions such as banks and credit unions have developed debit cards that can be used in a manner similar to the use of credit cards in making purchases. However, unlike credit cards, debit card purchases are typically posted to the consumer's financial account (e.g., checking account) within a few days of the debit transaction, with funds for the purchases being provided essentially at the time of posting. Therefore, monthly statements indicating a corresponding monthly balance including purchases for which payment is required are typically not issued (or are part of a monthly statement for the financial account) because the funds for the purchases are automatically taken directly from the consumer's checking account as each purchase posts. Correspondingly, there is no need for the consumer to pay a balance or minimum payment amount indicated on monthly statements.

With certain credit and debit card-type accounts, processing, managing and otherwise using the accounts under a variety of different conditions can be challenging. For instance, there may be more than one cardholder drawing on an account such as in the instance of a debit card associated with a joint checking account. If two users for a particular debit card account unknowingly make debit transactions during the same time period, overdrafts can occur. That is, in order to accurately maintain and manage charges against a particular account via a debit card, each user must generally immediately communicate any charges to other users. Similar problems can be encountered with credit cards, for example, when a credit limit is neared.

For many credit and debit card types of transactions, government-related compliance issues also apply. The manner in which accounts can function, relative to financial resources, credit limits, purchasing and other aspects often fall under certain compliance rules. These compliance rules generally require adherence and thus introduce another consideration to the management and processing of credit and debit card transaction processing and associated functions.

The above and other issues have presented challenges to the processing, management and use of debit cards and related transactions.

SUMMARY

The present invention is directed to overcoming the above-mentioned challenges and others related to the types of applications discussed above and in other applications. These and other aspects of the present invention are exemplified in a number of illustrated implementations and applications, some of which are shown in the figures and characterized in the claims that follow.

According to an example embodiment of the present invention, a transaction processing system and approach involves deferred payment with a consideration-bearing account as a funds basis, or source, upon which purchases can be levied. Purchase transactions against a transaction card are recorded and processed on a billing-cycle basis. At the end of a billing cycle, the consideration-bearing account and/or other sources are used as a funds source for purchase transactions.

In one implementation, purchases against the transaction card are tracked and redemption credits are awarded to the transaction card user(s) as a function of the purchases. These credits may, for example, include monetary credits applicable against purchases made against the transaction card, coupons, allocated funds (e.g., for purchasing from a particular source) or consumer-redeemable items such as frequent flier miles for use in purchasing airline tickets.

In another implementation, purchase transactions are authorized using a transaction card purchase limit established as a function of a balance in the consideration-bearing banking account. Purchases are authorized up to the transaction card purchase limit and, upon the provision of funds towards the purchases (e.g., at the end of a billing cycle or otherwise), the transaction card purchase limit is reassessed.

The above summary is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be applicable to a variety of different types of devices, processes and approaches, and has been found to be particularly suited for financial transactions involving a consideration-bearing banking account. While the present invention is not necessarily limited to such applications, various aspects of the invention may be appreciated through a discussion of examples using this context.

According to an example embodiment of the present invention, an approach for processing and managing payment for a user's transaction card purchases involves interactive payment with deferred billing and a consideration-bearing account for purchases against the transaction card. A transaction-card issuing institution uses billing cycles to manage the transaction card purchases and payment therefor. Funds available in the consideration-bearing account are used to establish a purchase limit for the transaction card.

When a transaction card purchase is initiated (e.g., by a merchant via a credit institution such as VISA) during a particular billing cycle, the issuing institution authorizes the purchase if it is within the purchase limit. Additional purchases made during the same billing cycle are authorized in a similar manner. In some instances, the purchases are authorized not only as a function of the purchase limit but also as a function of other purchases made during the billing cycle. Once authorized, the purchase is allowed to continue through to completion. The issuing institution passes funds for the purchases as may be common, for example, with credit-card-type transactions, but does not immediately draw funds from the user to cover the purchases.

The purchases made against the transaction card are tracked and presented to the user for payment to the issuing institution at the end of a billing cycle. In some applications, a separate transaction card purchase account is maintained to track these purchases (i.e., with accounting for the purchases maintained distinctly from accounting for the consideration-bearing banking account). During a time period (window) after the purchases are presented for payment, the user is afforded the opportunity to provide a source for funds for the payment. This source may, for example, be the consideration-bearing account or an outside source such as a banking account, a checking account, an investment account or a credit-type account. In some instances, funds are automatically drawn from the consideration-bearing account as a default condition, where the user does not specify another funds source within the time period.

After funds have been provided to the issuing institution, the transaction card purchase limit is reset, either directly or indirectly (by reduction in outstanding payments due) when the limit is accessed for authorization purposes. Additional purchases against the transaction card are processed in the above-discussed manner, with funds again provided at the end of a next billing cycle.

In some applications, purchases against the transaction card are tracked and used to provide a redemption credit for the user. The tracking involves, for example, assigning credits to match each monetary unit (e.g., dollar) associated with purchases against the transaction card during a particular billing cycle or, in some instances, accumulated over another time period. The credit may be a monetary credit or other type of credit that can be redeemed for a product and/or service. In some instances, monetary credits are unrestricted, wherein funds are provided directly to the user or credited against purchases made by the user, with use of funds associated with the credit being thus unrestricted to any particular category. In other instances, monetary credits are restricted, where the user must spend the value associated with the credits at a particular merchant or other supplier. Redemption-type credits such as vouchers, coupons and others are used in other instances, for use in applications from airline tickets to merchant-based products.

In another example embodiment, the transaction card is further equipped to make automated banking transactions, such as for withdrawing money from an automated teller machine (ATM) and others. Automated banking transactions are tracked in a manner similar to other transactions with the consideration-bearing banking account. In some instances, automated banking withdrawals are made with a deferred-billing approach. Funds withdrawn are provided by the issuing institution but are not assessed against the consideration-bearing account until after the end of a billing cycle, when the withdrawn funds are listed in a statement showing transaction card purchases.

In another example embodiment, a transaction purchase arrangement and approach (e.g., similar to that discussed above) involves managing a minimum balance in the consideration-bearing account with full payoff of transaction card purchases made in each billing cycle. Users (cardholders) earn points for purchases (e.g., one point per every monetary unit such as a U.S. dollar) made with their card, while they continue to earn competitive interest rates on their consideration-bearing account. The transaction purchase arrangement tracks transaction card purchases against the consideration-bearing account but does not assess the purchases against the account until the end of a payment period for a particular billing cycle. Funds are automatically transferred from the consideration-bearing account at the end of the payment period to cover transaction card purchases made during the period. In this regard, users continue to accumulate interest upon funds in their consideration-bearing account until the end of the payment period.

In some applications, the transaction purchase arrangement automatically generates a combined account statement showing consideration-bearing account activity and transaction card purchases during a particular billing cycle. The transaction card purchases are automatically deducted from the consideration-bearing account at the end of the payment period. The transaction purchase arrangement reflects this automatic deduction in the consideration-bearing account activity on the statement for the next billing cycle. These approaches are readily implemented with a variety of applications, such as those discussed in connection with FIG. 6 and other figures below.

Figure 1:
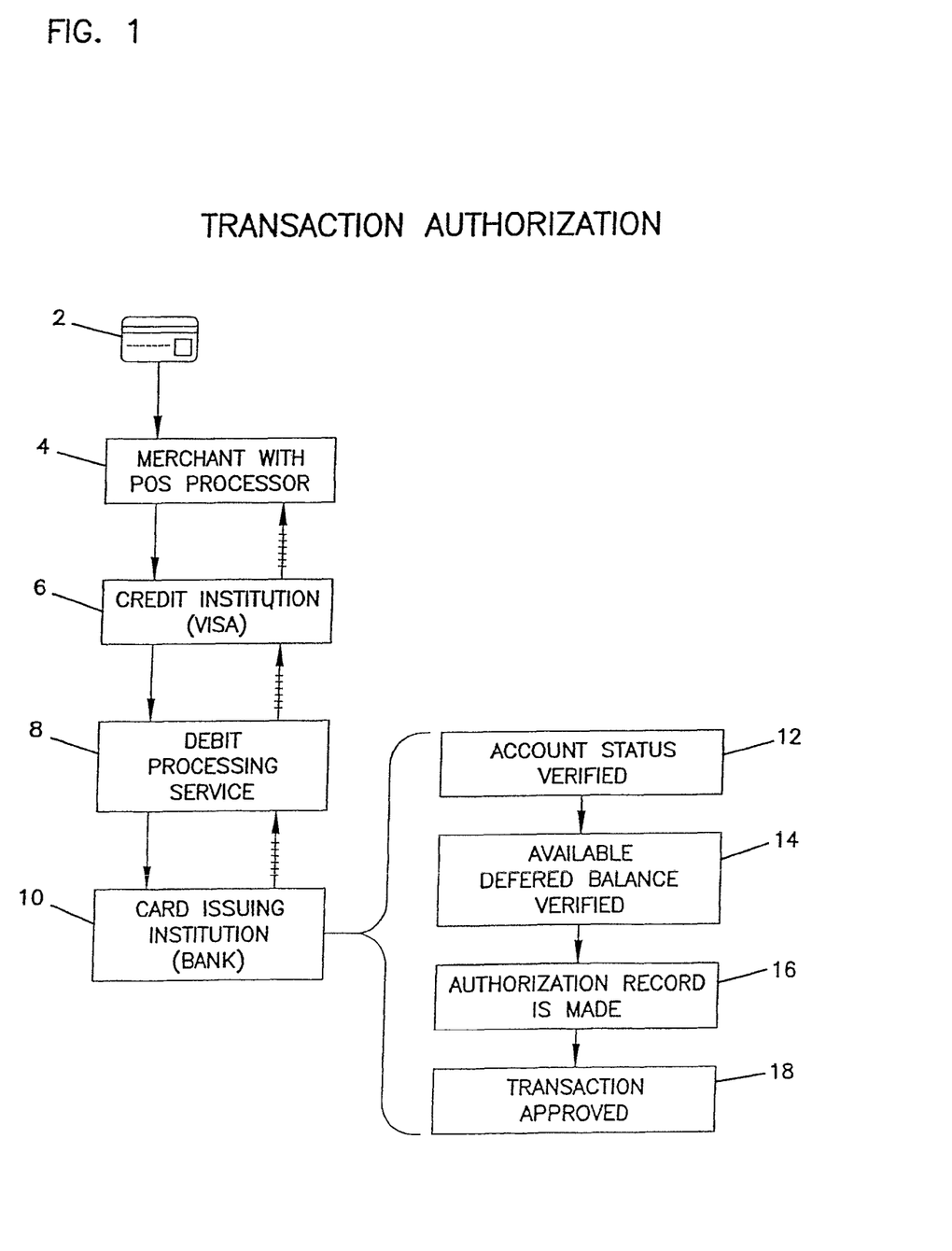
FIG. 1 is a schematic flow chart of a debit transaction authorization process in accordance with an example embodiment of the present invention.
Figure 2:
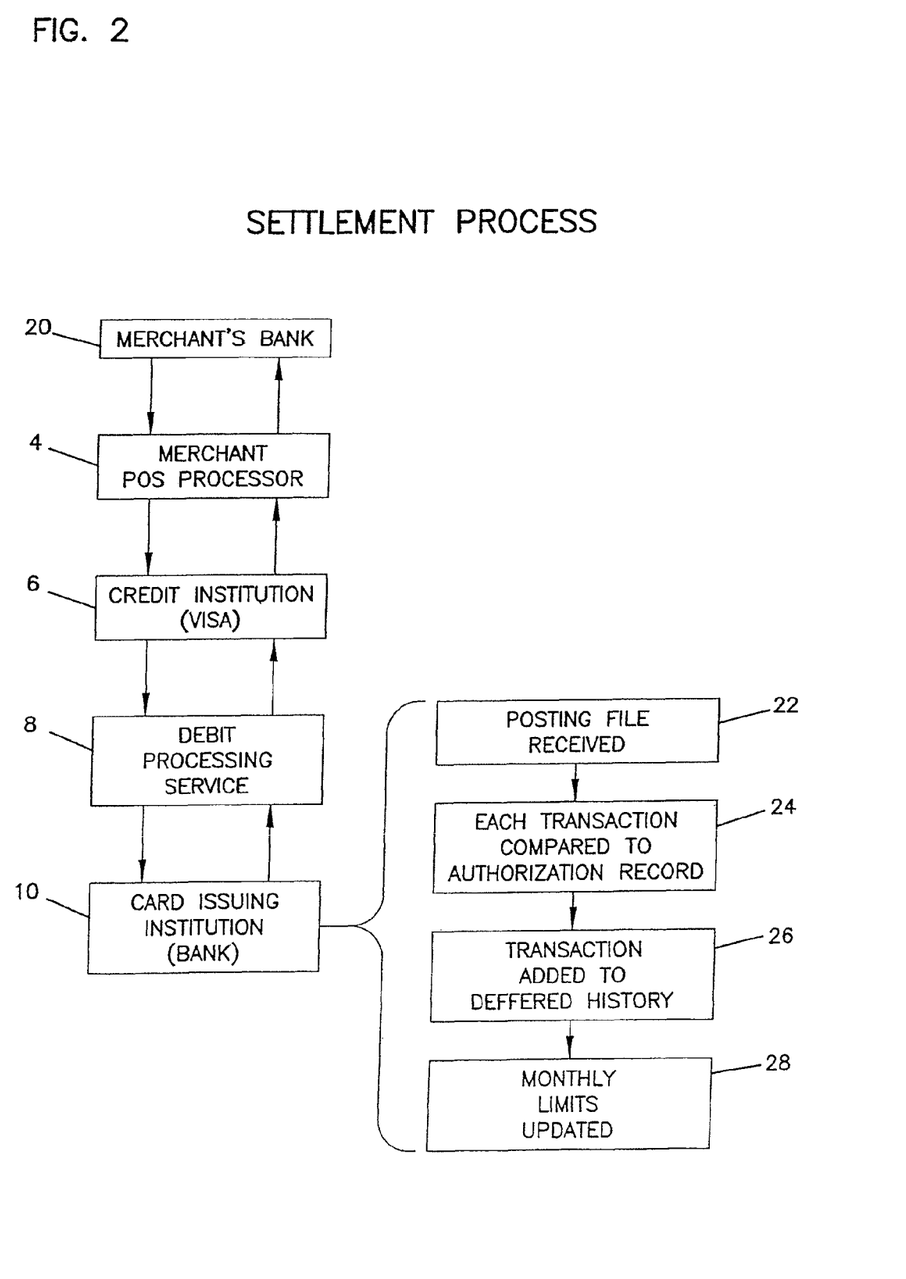
FIG. 2 is a schematic flow chart of a debit transaction settlement process in accordance with another example embodiment of the present invention.

FIGS. 1 and 2 respectively show debit transaction authorization and debit transaction settlement approaches in connection with example embodiments of the present invention. Transactions implemented with these approaches typically involve a consumer or debit card account holder with a debit card 2, a merchant with a point of sale processor 4, a debit card issuing financial institution 10 (that issued the debit card for use with the consumer's account) and a credit institution 6 such as VISA or MASTERCARD. In some instances, an intermediary clearinghouse or debit processing service 8 is also involved. The debit card issuing financial institution 10 may be any bank, credit union or similar institution at which the consumer or account holder has opened a checking, savings, or other financial account.

A debit transaction occurs in two phases or steps. Typically, the first phase is an authorization phase. An example authorization process is shown in FIG. 1. In the authorization phase the merchant 4 obtains verification and authorization from the debit card issuing financial institution 10 that the debit card 2 is valid and that the user has not exhausted a deferred purchase periodic limit. The authorization phase occurs before the merchant 4 allows the consumer to make the purchase. The second phase is typically a settlement phase, with an example settlement phase approach shown in FIG. 2. In the settlement phase, funds are eventually transferred from the consumer's account at the financial institution to the merchant.

In the authorization phase, the debit card user presents a debit card 2 to the merchant 4 in order to make a purchase. The merchant swipes the card through a point of sale processor that reads account information encoded on the debit card 2 and combines it with information such as the date, the amount of the purchase and the merchant's identification. The point of sale processor transmits the debit transaction information to the credit institution 6 identified by the debit card 2 such as VISA.

The credit institution 6 then identifies the card issuing financial institution 10 and transmits the debit transaction information to the card issuing financial institution 10 either directly or through a debit processing service 8. The information is received by the card issuing financial institution 10, which identifies an account corresponding to the debit card 2 being used. Verifications against the identified account are run to determine whether the debit transaction should be authorized. For instance, the account status may be verified 12 as a valid, open account that has not been put on hold. The amount of the purchase is checked against a deferred debit purchase monthly spending limit 14 (e.g., a spending limit corresponding to an amount in the account holder's debit account, or otherwise determined for the account holder). In some instances, the deferred debit purchase spending limit is the amount in debit purchases the debit card account holder is permitted to make each month and is set, for example, between $1,000 and $20,000.

In some instances, the card issuing financial institution 10 uses a computer system to process debit transactions. Using FIG. 4 as an example, a managing computer system 50 processes debit transaction information received via a receiver system 40 (e.g., using high speed dedicated communication lines). After identifying an account corresponding to the debit card 2 being used, the managing computer system 50 runs verifications against the identified account to determine whether the debit transaction should be authorized as discussed above.

Figure 4:
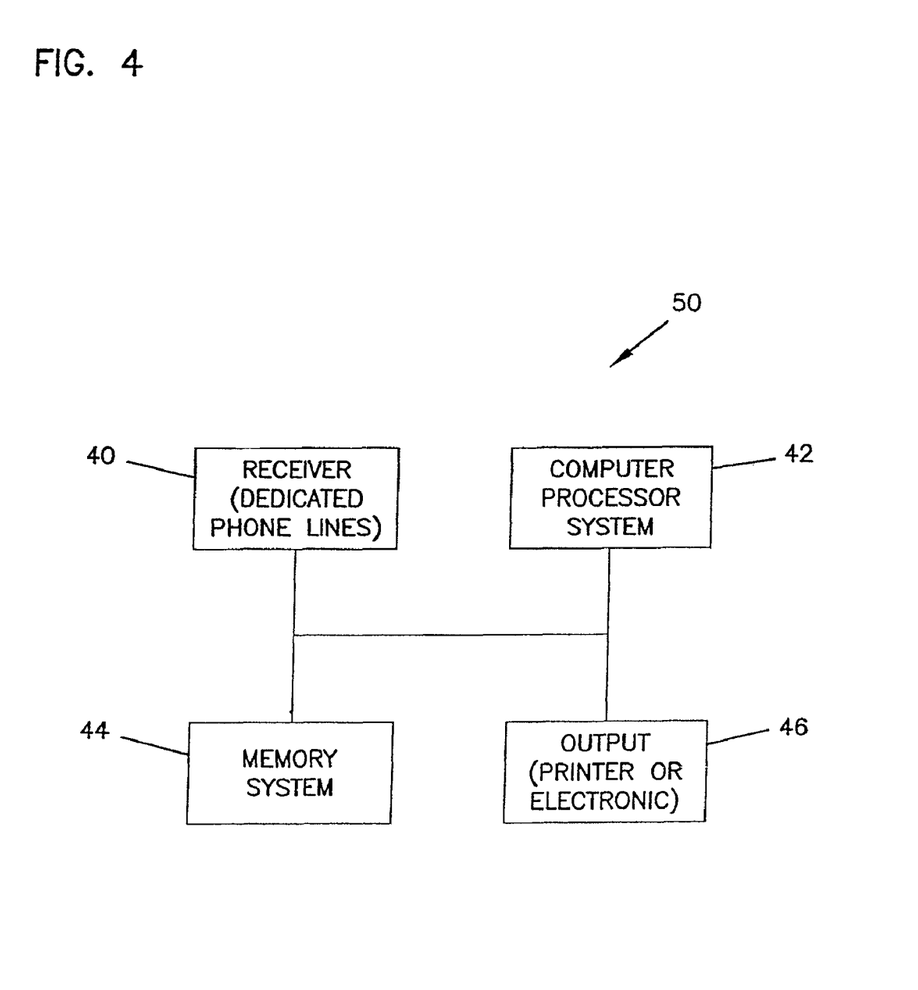
FIG. 4 is a schematic diagram of the components of a computer system, according to another example embodiment of the present invention.

Upon approval by the card issuing financial institution 10, an authorization record is stored 16 (e.g., in a managing computer system's memory system 44 as shown in FIG. 4), noting the debit transaction information. An authorization signal is then sent back from the card issuing financial institution 10 through the credit institution 6 to the merchant's point of sale processor 4 where the debit transaction is authorized.

The settlement phase begins when the merchant 4 or the merchant's bank 20 requests payment from the credit institution 6 to cover the debit transactions authorized by the card issuing financial institution 10. Typically, at the end of a business day a merchant 4 will total the debit transactions performed and request payment from the credit institution 6. The credit institution 6 pays the merchant 4 and demands payment from the card issuing financial institution 10 by issuing a schedule or posting file 22 of all the transactions authorized by the card issuing financial institution 10. When the card issuing financial institution 10 receives the posting file, the financial institution verifies each debit transaction listed against the authorization records stored when the authorization was given 24. Upon verification, the card issuing institution 10 makes payment to the credit institution 6 and further makes a deferred transaction billing record or history 26 without necessarily debiting the amount of the transaction against the consumer's account. The spending limit balance available is then updated 28 to reflect the purchase made.

Referring again to FIG. 4, a managing computer system 50 may be implemented to accumulate a billing record of all debit transactions for a billing cycle without necessarily debiting the consumer's account. The debiting of the account is deferred, with a deferred transaction history maintained for each account.

Figure 3:
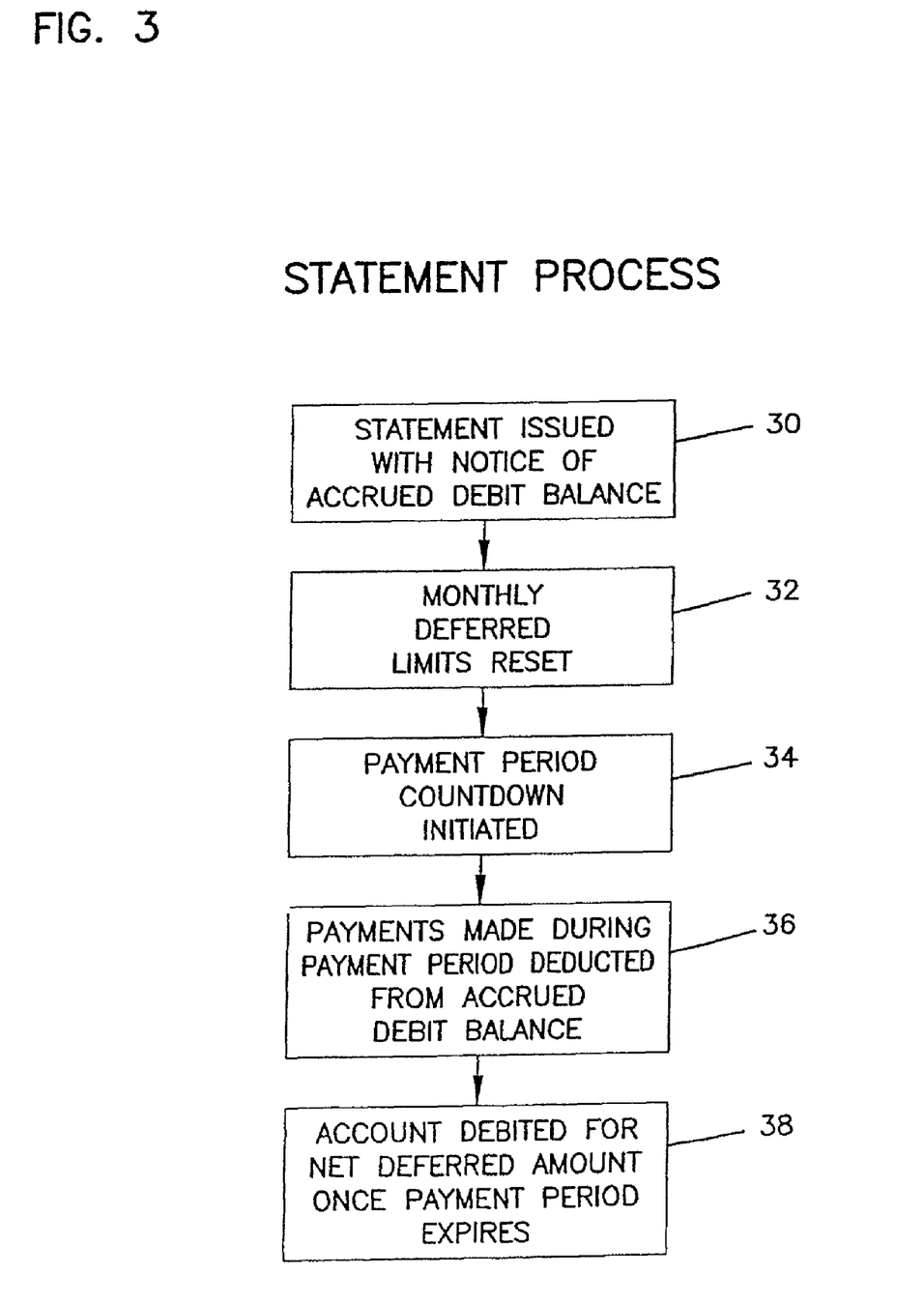
FIG. 3 is a schematic flow chart of the statement and debit process in accordance with another example embodiment of the present invention.

FIG. 3 shows another approach that can be implemented in connection with the above discussed examples, according to another example embodiment. At the end of a billing cycle, the managing computer system 50 recalls the billing history and issues a statement that includes a notice itemizing and totaling the deferred debit transaction history for the consumer's account. The statement shows an accrued debit balance for the billing cycle. In connection with the statement issued to the debit card account holder 30, the billing cycle spending limit is reset 32, allowing the debit card account holder to make additional deferred purchases for a new billing cycle. For example, when the consumer makes funds available either directly or indirectly (e.g., via an automatic withdrawal), the spending limit can be reset. The statement may be made either through conventional hard copy reports or using an electronic approach. For example, the statement may be made available to the consumer by electronically posting the statement information at a secure site such as an Internet site accessible by the account holder's personal computer 56, via email or through an automated telephone service.

Figure 5:
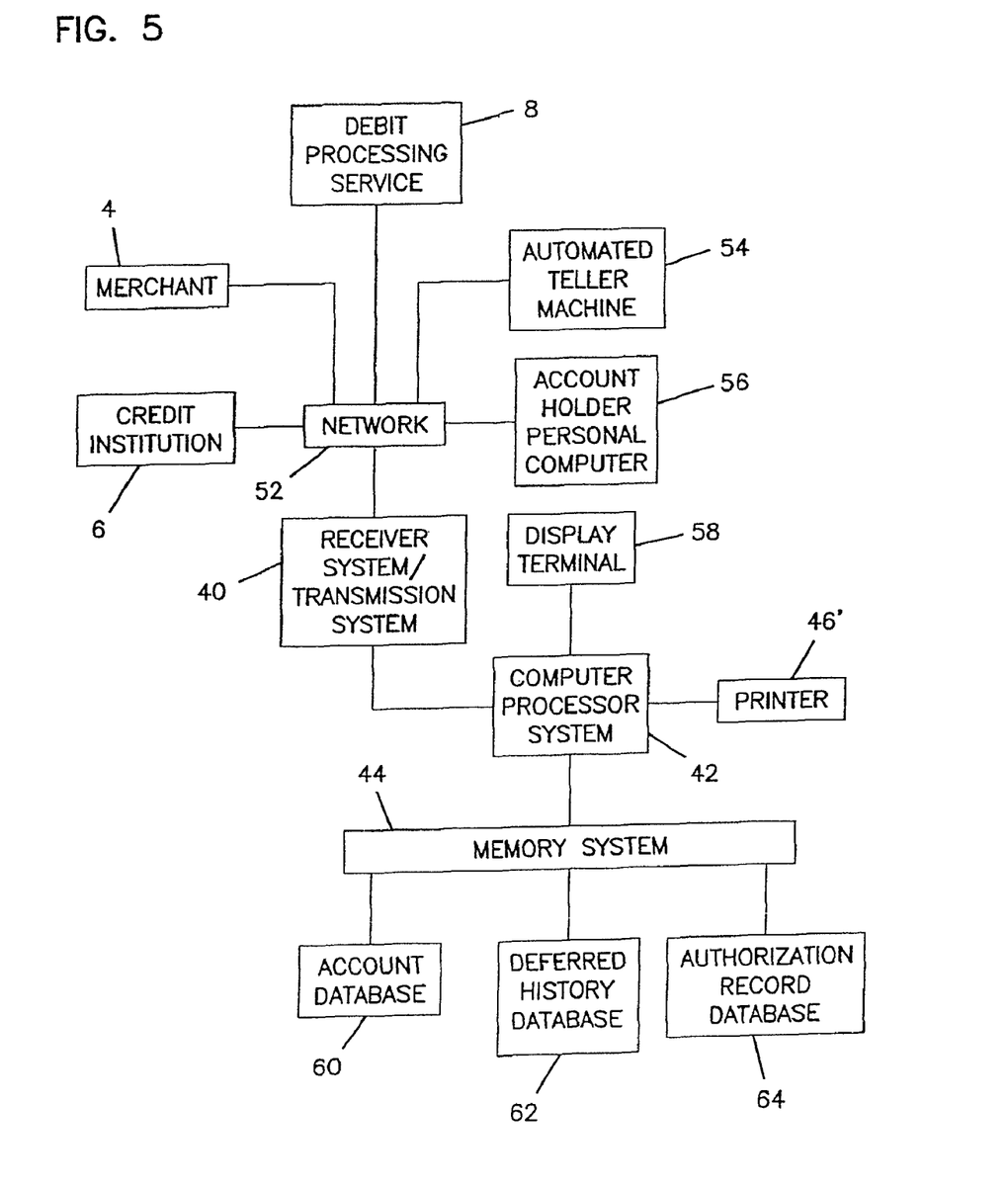
FIG. 5 is a schematic diagram of a networked computer managing system, according to another example embodiment of the present invention.

In connection with an example embodiment, FIG. 5 shows a data storage approach that can be used with the managing computer system 50, employing a memory system 44. The memory system 44 may be divided into databases that include one or more of an account database 60, a deferred history database 62 and an authorization record database 64. A record of authorization is made in the authorization record database 64 during the authorization phase (e.g., as described above). The record may then be recalled from the authorization record database 64 and a new record made in the deferred history database 62 during the settlement phase.

In another example embodiment, in connection with the above-discussed figures, after providing a statement to the debit card account holder, a managing computer system initiates a payment period countdown 34. During the payment period countdown, the debit card account holder has the opportunity to designate or provide sources of payment to cover the debit transactions by supplementing the funds of the account itself or by designating another account. The account holder may transfer funds from a credit line or from funds outside the debit card issuing financial institution. The transfer may be accomplished by phone or even electronically. Any payments made during the payment period are deducted from the accrued debit balance 36 which may be recorded in a deferred history database. When the payment period expires, the managing computer system automatically debits the debit card account or another designated account for the accrued debit balance 38. The debiting may be accomplished by recalling the deferred debit balance 38 from the deferred history database 62 and debiting an account database 60 as shown in FIG. 5.

In one implementation, the system is configured so that the debit cards may be used in automated teller machines 54 to make automated banking transactions such as deposits and withdrawals. The managing computer system 50 is configured to distinguish automated banking transactions from debit transactions wherein the debiting of the debit transactions is deferred during the payment period. Accordingly, depending upon system configurations, automated banking transactions either may be posted to the account during online or batch processing, or they may be deferred.

Communications with account holders as discussed in connection with the figures above and otherwise are carried out in a variety of manners. In one implementation, an output system 46 is used to make a statement available to account holders. The output system 46 may include a printer system for generating hard copy statements to be sent by mail to the account holder or the statement may be made available by electronic means via electronic mail or posting on a secure Internet site.

Figure 6:
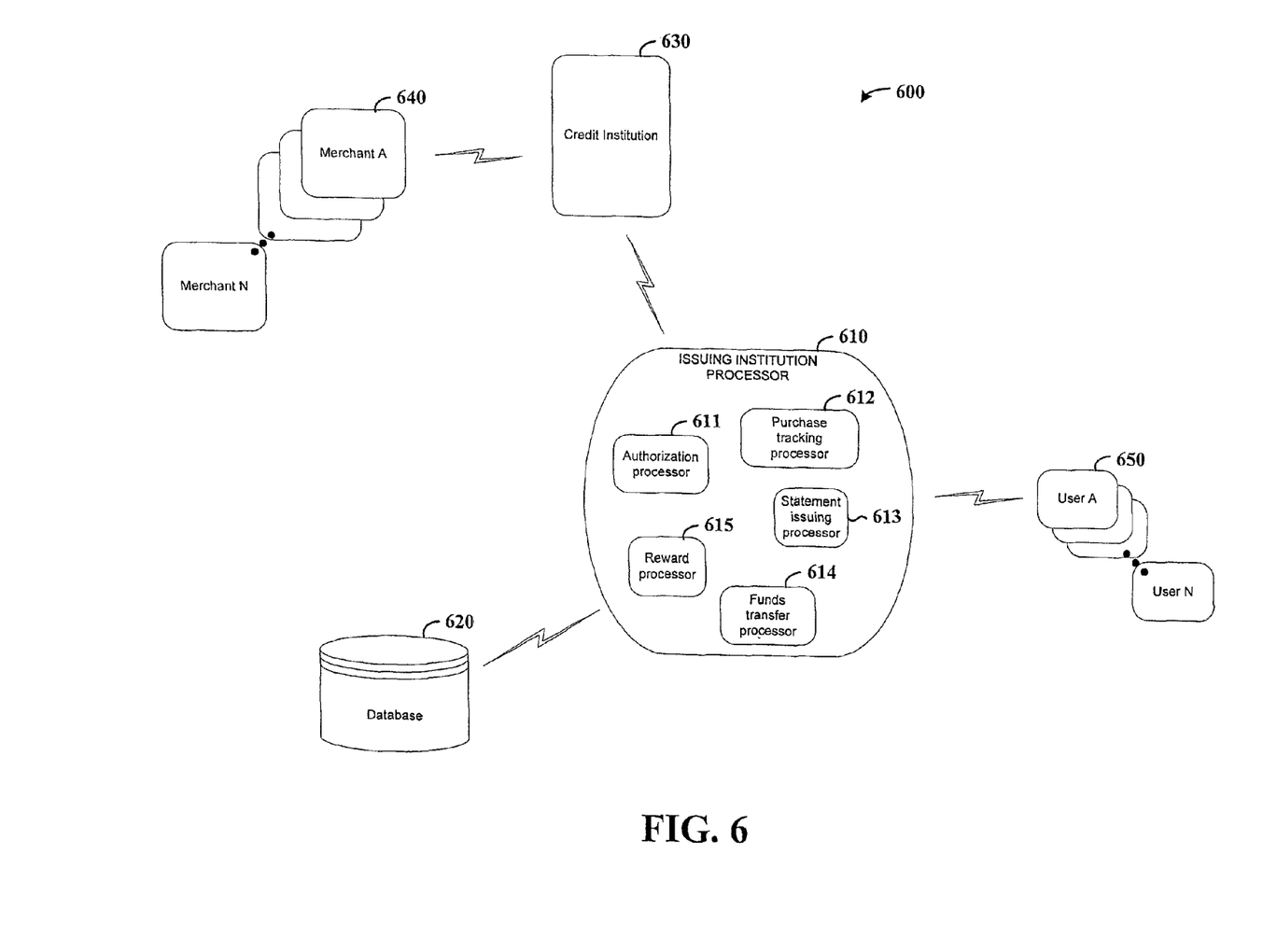
FIG. 6 is an arrangement for processing and managing transaction card purchases, according to another example embodiment of the present invention.

FIG. 6 shows an arrangement 600 for processing and managing transaction-card purchases, according to another example embodiment of the present invention. The arrangement 600 may be implemented, for example, using and/or in connection with one or more of the examples discussed above as well as the other figures. An issuing institution processor 610 communicates with a credit institution 630 for processing transaction card purchases with one or more of a plurality of merchants (A-N) 640. The issuing institution processor 610 further communicates with a plurality of users (A-N) 650 for managing accounts associated with transaction cards assigned to the users. Information used in processing transaction card purchases initiated at the merchants 640, as well as in managing user accounts (e.g., consideration-bearing banking accounts and/or transaction card purchase accounts), is stored in a database 620. In addition, the issuing institution processor 610 carries out reporting functions such as bankruptcy and fraud reporting, credit bureau reporting and others as typically associated with credit and/or debit type purchases. In various implementations, the database 620 is used for storing information for use in purchase authorization and/or tracking, statement issuing, funds transfer and reward processing, as discussed further below.

The issuing institution processor 610 includes a variety of processing functions related to transaction card purchases and corresponding account management, and facilitates deferred accounting and rewards (e.g., redemption credits as discussed herein) related to transaction card purchases. An authorization processor 611 authorizes purchases for requests made by the credit institution 630 in response to transactions initiated with a user's transaction card at one of the merchants 640. A transaction card purchase tracking processor 612 tracks transaction card purchases during a billing cycle for each user 650.

The authorization processor 611 uses the tracked purchases to authorize transaction card purchase requests made via the credit institution 630. For example, where a particular purchase limit is employed to limit purchases made during a billing cycle, the authorization processor 611 authorizes a new purchase when the new and tracked purchases do not exceed the purchase limit.

In some instances, the authorization processor 611 authorizes purchases using a dynamic assessment of a purchase limit, using both the tracked purchases and an amount of funds available in an account for the user making the purchase. For example, where a purchase limit is set as a function of available funds in a particular account, new purchases that do not exceed the available funds, less an amount of tracked purchases, are authorized. The issuing institution processor 610 limits withdrawal of funds from the account against which the purchases were authorized to ensure that sufficient funds for tracked purchases are maintained in the account.

In one implementation, the authorization processor 611 works with the purchase tracking processor 612 to dynamically assess available funds and an associated purchase limit. Each user's account is set with a pre-defined minimum balance as well as a pre-defined credit limit, which are stored, e.g., in the database 620. When funds in the user's account (e.g., a checking account) are equal to or exceed the minimum balance, the user is allowed to make purchases against the entire credit limit (less outstanding purchases). In this regard, the authorization processor 611 authorizes aggregate purchases during a particular billing cycle up to the credit limit; if a particular purchase would, with other purchases already approved during the billing cycle, exceed the credit limit, the authorization processor does not authorize that particular purchase.

When funds in the user's account are less than the minimum balance, the user's ability to make purchases against the credit limit are inhibited (e.g., reduced or eliminated). For example, when terms of a user's account indicate that the user must maintain the minimum balance in a banking account in order to make transaction card purchases against the credit limit, the authorization processor 611 suspends the user's ability to conduct purchases when the banking account drops below the minimum balance. As another example, terms of a user's account may be such that the credit limit is simply adjusted (e.g., reduced) in an amount that is related to the amount that the user's banking account is below the minimum balance. Furthermore, where a user's account is set up with overdraft protection, the balance in a banking account that is compared with the minimum balance discussed above may include such an overdraft protection amount. Additional examples with overdraft protection, and over limit purchases, are discussed further below.

The above-discussed minimum balance of a user's account is drawn from one or more different accounts, depending upon the implementation. In addition, as discussed herein, a user's "account" may include one or more accounts, belonging to one or more users when the users share one or more aspects of a transaction card and/or accounts associated with a transaction card.

In one example, the issuing institution processor 610 manages and processes a transaction card account for married couples who hold separate checking accounts against which transaction card purchases are processed. A household balance applied to accounts held by the married couple is determined by adding the balance of checking accounts for each partner to the marriage. In this regard, the authorization processor 611 uses the household balance when processing transaction card purchases and related transactions in connection with a minimum balance as discussed above.

In another example, the issuing institution processor 610 uses a tax identification number (TIN) for users to identify accounts upon which a household balance, as discussed above, is calculated. The TINs for each user sharing a particular transaction card account are stored in the database 620. When an account balance is to be determined, the authorization processor 611 (or other component) uses all accounts associated with all TINs for the particular transaction card account.

When a billing cycle is over as indicated, e.g., by the purchase tracking processor 612 or another function of the issuing institution processor 610, a statement issuing processor 613 issues a statement to each user 650 (e.g., electronically or otherwise). The issued statement generally indicates purchases made during the billing cycle against, but not applied to, an account maintained for each user by the issuing institution processor 610. In certain implementations, the statement includes account information for the user showing, e.g., balance information for an account against which the user's purchases are made, as well as other information relating to additional accounts that the user has with the issuing institution. Credit limits applicable to the account are optionally reset upon the issuance of the statement or, in some instances, upon the provision of funds to cover purchase transactions indicated in the statement.

In one implementation involving multiple users on a single account (e.g., involving a household-type account based upon a common user account), the statement issuing processor 613 segregates transactions relative to the particular user involved in the transaction. For instance, where two people use a single transaction card account, and each person uses a transaction card with his or her name on it, the statement issuing processor 613 segregates the transactions on the statement using the name on the card used in the transaction.

A funds transfer processor 614 manages the transfer of funds in each user's account to pay for purchases made during the billing cycle, and is configured for transferring funds in one or more of a variety of manners. For example, when a particular user does not provide funds for use in paying for purchases tracked during a billing cycle, the funds transfer processor 614 can be implemented to automatically transfer funds from the user's account to cover the purchases.

In another example, the funds transfer processor 614 is further configured for transferring funds from alternate and/or additional sources, as identified by each user. For example, when a user receives a statement from the statement issuing processor 613, the user can specify a particular funds source to use for some or all of the purchases made during a billing cycle. In this regard, the funds transfer processor 614 transfers funds from the source specified by the user. If no source is specified, a default account is used for transfer of the funds; this account may be the account against which purchases are made and authorized or may be another pre-specified default account. In this regard, while purchases are made and authorized against a particular account for each user (e.g., a checking account), the source of the funds transferred for covering purchases for a particular business cycle may be a different account such as a banking, credit or brokerage account.

A reward processor 615 uses information from the purchase tracking processor 612 to track and process rewards. For each billing cycle, the amount of tracked purchases is used to assess a reward amount, which is tracked over several billing cycles. The rewards may, for example, be assessed on a point or other relative scale, in association with monetary units (e.g., U.S. dollars) spent on purchases. These rewards are further optionally identified in statements issued by the statement issuing processor 613, with an accumulated balance of rewards indicated to each user.

When a user attempts to redeem rewards (e.g., to use earned points against purchases or other reward items), the rewards processor 615 assesses the tracked rewards and, if sufficient rewards are available, authorizes the redemption. The rewards processor 615 further deducts the rewards from the tracked rewards upon redemption.

The reward processor 615 further facilitates access to reward information, such as a point balance for rewards assessed as points, to the users 650. This access may be facilitated, for example, via an Internet website operated by the issuing institution processor 610 or by an external processor. In this regard, some or all of the functions of the reward processor 615 may be carried out at a location remote from the issuing institution processor 610.

In another example embodiment, a transaction card purchase tracking processor, such as the purchase tracking processor 612 in FIG. 6, is configured and arranged for tracking over limit purchases. That is, when a user makes purchases against a transaction card that, together with other active purchases (e.g., during a particular billing cycle) exceed a purchase limit, the over limit amount is tracked. The over limit amount may, for example, be an amount over a preset limit but below an amount of funds available in an associated bank account used for paying for the tracked transactions. The over limit may also be an amount over available funds in such an associated bank account, such that insufficient funds would be available for paying for the tracked purchases, were funds to be withdrawn from the account.

In one implementation, interest is charged against the amount of the over limit purchases. Individual user accounts are associated with a particular interest rate as defined, e.g., by a user agreement between an issuing institution and the user. The interest rate is assessed against the over limit amount and issued in a statement provided to the user for payment.

In another implementation, the over limit amount is automatically billed to an account specified by the user, such as an overdraft account. The specified account may, for example, be a credit type account, against the balance of which an interest rate is applied, or a banking account bearing funds that can be used to cover the over limit amount. A credit-type over limit account may be managed by the issuing institution itself, or by an external source (e.g., where a charge is assessed against a credit card account in a manner similar to a purchase made against the credit card).

In more specific embodiments, useful for specific example applications (not necessarily implemented as part of the above example embodiments), reference may be made to the following credit limit management and processing approaches. In addition, for various ones of these approaches, notification is used to alert customers (users) and/or financial institutions of conditions relating to balance, credit limit or other transaction card and account characteristics.

For accounts with a low-level credit limit (here, $2,000 for discussion purposes), the ability to conduct merchant purchases is suspended when the account balance drops to less than a preset amount over the low-level credit limit (here, $2,500 for discussion purposes). When the balance is $2,500 or above, the customer may access the entire card limit. In the case of accounts with overdraft protection, the remaining overdraft protection line would be added to the ledger balance for the purpose of determining the accessibility to the card limit. Examples with such a low-level credit limit are as follows:

If a customer's (user's) banking account balance is $2,500 or above, the customer is allowed to make merchant purchases up to the card limit, which in this case is $2,000. After the statement is produced, the customer would again have access to their limit of $2,000, even if they had a pending payment of $2,000.

If the customer's banking account balance is a negative $1,000 and the approved card limit is $2,000, the customer's card purchase activity would be suspended. Once the account balance is brought to $2,500 or above, the customer again has the ability to make merchant purchases up to the $2,000 limit.

If the customer's banking account balance is a negative $1,000, the approved card limit is $2,000 with a pending card payment of $700 (e.g., from a recent billing cycle) and unstatemented card purchases of $200 (e.g., purchases in a current billing cycle), the customer's card purchase activity is suspended.

If the payment pending remains at $700 and the unstatemented purchases at $200, and if the customer brings his account balance up to between $0 and $2,499.99, the customer's available credit would still be $0 at that point in time. However, if the customer brings his account balance up to $2,500 or greater, his available credit would be $1,800 at that point in time.

For accounts with a higher-level credit limit (here, greater than $2,500 for discussion purposes), examples are as follows:

If the customer's banking account balance falls below $2,500, the ability to conduct merchant purchases is limited to the customer's approved card limit minus 1) pending card payments, 2) unstatemented card purchases and 3) any negative ledger balance if the customer's banking account is negative.

Whenever the balance is $2,500 or above, the customer may access the entire card limit. In the case of accounts with overdraft protection, the remaining overdraft protection line is added to the ledger balance for the purpose of determining the accessibility to the card limit.

The following are additional examples of processing approaches used with a higher-level credit limit:

If the customer's banking account balance is $2,500 or above and the approved card limit is $5,000, the customer is allowed to make merchant purchases up to the card limit, which in this case is $5,000. After the statement is produced, the customer would again have access to the limit of $5,000, even if there was a pending payment of $5,000.

If the customer's banking account balance is a negative $1,000 and the approved card limit is $5,000, the customer is allowed to make merchant purchases of $4,000. Once the customer's banking balance was brought to $2,500 or above, the customer would again have the ability to make merchant purchases up to the customer's limit, which is $5,000 in this case.

If the customer's banking account balance is a negative $1,000, the approved card limit is $5,000, and there is a pending card payment of $700 and unstatemented card purchases of $200, the customer is allowed to make additional merchant purchases of $3,100. Once the customer's banking balance is brought to zero or above, the customer again has the ability to make merchant purchases up to the customer's limit, which is $5,000 in this case.

Assuming the payment pending remains at $700 and the unstatemented purchases at $200, if the customer brings the banking account balance up to $0 to $2,499.99, the available credit would be $4,100 at that point in time. If the customer brings the banking account balance up to $2,500 or greater, the available credit would be $4,800 at that point in time.

While the present invention has been described with reference to several particular example embodiments, those skilled in the art will recognize that many changes may be made thereto without departing from the spirit and scope of the present invention.

What is claimed is:

1. A computer system comprising:
   at least one processing circuit configured to,
      during a current billing cycle,
         receive debit transaction requests from a cardholder using a debit card linked to an interest-bearing account,
         maintain a balance of accrued debit transactions for the billing cycle, impose a purchase limit, different from an amount of cardholder funds in the interest-bearing account, on the balance of accrued debit transactions;
         verify that the amount of cardholder funds, adjusted by the balance of accrued debit transaction, is of a sufficient amount for the transaction requests, and
         authorize the debit transaction requests in response to the verification of the amount of cardholder funds; and
      after the current billing cycle completes,
         communicate, to the cardholder, a statement that includes the balance of accrued debit transactions,
         receive a payment amount from the cardholder,
         reduce the balance of accrued debit transactions by the payment amount received from the cardholder, and
         in response to an expiration of a payment time window, debit the reduced balance of the accrued debit transactions from the account linked to the debit card.

2. The system of claim 1, wherein the at least one processing circuit is further configured to receive the payment amount from an investment account.

3. The system of claim 1, wherein the interest-bearing account linked to the debit card is held at a first financial institution and the at least one processing circuit is further configured to receive the payment amount from a second financial institution that is different from the first financial institution.

4. The system of claim 1, wherein the at least one processing circuit is further configured to impose the purchase limit by detecting transaction requests, from the cardholder using the debit card, that exceed the purchase limit when added to the balance of accrued debit transactions.

5. The system of claim 4, wherein the at least one processing circuit is further configured to impose the purchase limit by preventing purchases until after the balance of accrued debit transactions is brought below the purchase limit.

6. The system of claim 1, wherein the at least one processing circuit is further configured to implement the communication of the statement using a website.

7. The system of claim 1, wherein the at least one processing circuit is further configured to reduce an available balance of the interest-bearing account by a portion corresponding to the balance of accrued debit transactions and thereafter to provide interest on the portion corresponding to the balance of accrued debit transactions during the billing cycle.

8. The system of claim 1, wherein the at least one processing circuit is further configured to track a rewards amount that is responsive to debit card transactions.

9. The system of claim 1, wherein the at least one processing circuit is further configured to limit cash withdrawals from the interest-bearing account as a function of the amount of cardholder funds in the interesting-bearing account as reduced by the balance of accrued debit transactions.

10. The system of claim 1, wherein the at least one processing circuit is further configured to reset the purchase limit in response to the billing cycle completing and before receipt of the payment amount from the cardholder.

11. The system of claim 1, wherein the at least one processing circuit is further configured to verify that the amount of cardholder funds in the interest-bearing account linked to the debit card is of a sufficient amount for the transaction request by calculating an approved card limit minus, pending card payments, debit card purchases from a previous billing cycle and any negative ledger balance of the interest-bearing account.

12. A computer-implemented method comprising:
using at least one processing circuit to,
receive debit transaction requests from a cardholder using a debit card linked to an interest-bearing account,
maintain a balance of accrued debit transactions for the billing cycle,
impose a purchase limit, different from an amount of cardholder funds in the interest-bearing account, on the balance of accrued debit transactions;
verify that the amount of cardholder funds, adjusted by the balance of accrued debit transaction, is of a sufficient amount for the transaction requests, and
authorize the debit transaction requests in response to the verification of the cardholder funds; and
after the current billing cycle completes,
communicate, to the cardholder, a statement that includes the balance of accrued debit transactions,
receive a payment amount from the cardholder,
reduce the balance of accrued debit transactions by the payment amount received from the cardholder, and
in response to an expiration of a payment time window, debit the reduced balance of the accrued debit transactions from the account linked to the debit card.

13. The method of claim 12, further including the step of using the at least one processing circuit to receive the payment amount from an investment account.

14. The method of claim 12, wherein the interest-bearing account linked to the debit card is held at a first financial institution and further including the step of using the at least one processing circuit to receive the payment amount from a second financial institution that is different from the first financial institution.

15. The method of claim 12, wherein the step of using the at least one processing circuit to impose the purchase limit includes detecting transaction requests, from the cardholder using the debit card, that exceed the purchase limit when added to the balance of accrued debit transactions.

16. The method of claim 15, wherein the step of using the at least one processing circuit to impose the purchase limit includes preventing purchases until after the balance of accrued debit transactions is brought below the purchase limit.

17. The method of claim 12, further including the step of using the at least one processing circuit to implement the communication of the statement using a website.

18. The method of claim 12, further including the step of using the at least one processing circuit to reduce an available balance of the interest-bearing account by a portion corresponding to the balance of accrued debit transactions and to provide interest on the portion corresponding to the balance of accrued debit transactions during the billing cycle.

19. The method of claim 12, further including the step of using the at least one processing circuit to track a rewards amount that is responsive to debit card transactions.

20. The method of claim 12, further including the step of using the at least one processing circuit to limit cash withdrawals from the interest-bearing account as a function of the amount of cardholder funds in the interesting-bearing account as reduced by the balance of accrued debit transactions.

21. The method of claim 12, further including the step of using the at least one processing circuit to modify the purchase limit in response to the amount of the funds in the interest-bearing account.

22. The method of claim 12, further including the step of using the at least one processing circuit to reset the debit transaction limit in response to the billing cycle completing and before receipt of the payment amount from the cardholder.

23. The method of claim 12, further including the step of using the at least one processing circuit to verify that the amount of cardholder funds in the interest-bearing account linked to the debit card are of a sufficient amount for the transaction request by calculating an approved card limit minus, pending card payments, debit card purchases from a previous billing cycle and any negative ledger balance of the interest-bearing account.

* * * * *